Dec. 16, 1930.       A. E. MINIUM       1,785,203
BRAKE MECHANISM
Filed Oct. 11, 1929
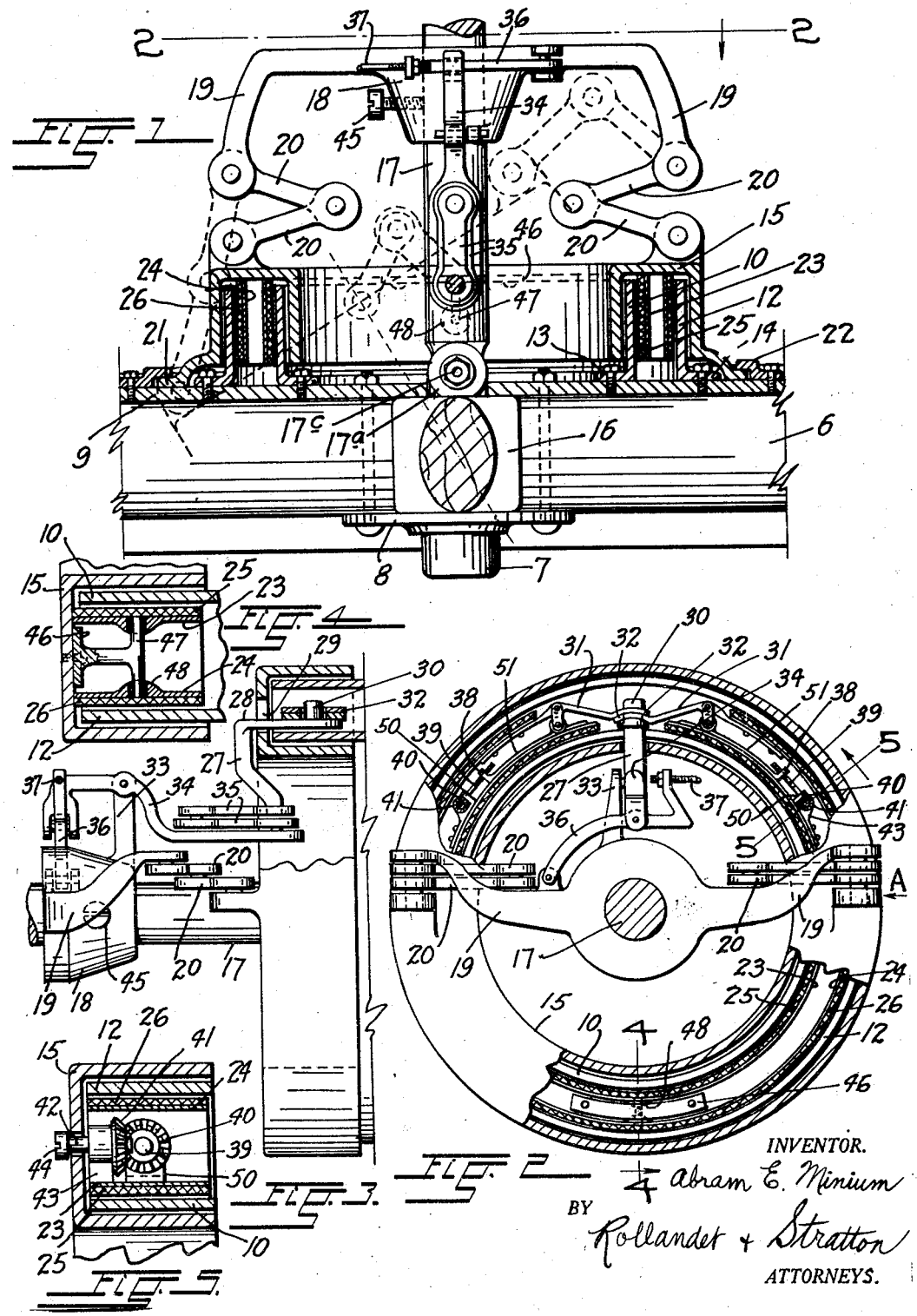
INVENTOR.
Abram E. Minium
BY Rollander & Stratton
ATTORNEYS.

Patented Dec. 16, 1930

1,785,203

UNITED STATES PATENT OFFICE

ABRAM E. MINIUM, OF DENVER, COLORADO, ASSIGNOR OF ONE-HALF TO GUSTAVE J. ORNAUER, THEODORE E. SYMAN, AND WALTER J. HEATH, ALL OF DENVER, COLORADO

BRAKE MECHANISM

Application filed October 11, 1929. Serial No. 398,951.

My invention relates to brakes intended primarily for motor driven vehicles. An object of the invention is to provide a combined expanding and contracting brake operable by a single actuating mechanism.

Another object is to provide a brake for the steering wheels of a motor driven vehicle.

A further object is to provide a simple and effective mechanism adapted to adjust both the contracting and expanding members of the brake by a single operation.

Still other objects reside in detail of construction and in novel combinations and arrangements of parts, which will more fully appear in the course of the following description.

In the drawings like reference characters designate similar parts in the several views.

Figure 1 is a plan view, partly in section, of mechanism embodying the foregoing objects.

Figure 2 is a section taken on the line 2—2 of Figure 1, with the housing of the brake partly broken away.

Figure 3 is an elevation, partly in section, looking in the direction of the arrow "A" of Figure 2.

Figure 4 is a section taken on the line 4—4 of Figure 2.

Figure 5 is a section taken on the line 5—5 of Figure 2.

Referring more specifically to the drawings, the reference numeral 6 designates the spokes of a wheel to which the present invention has been applied. The spokes project from a hub 16 on an axle 17. A hub cap for the wheel is shown at 7. Plates 8 and 9 are bolted together at opposite sides of the wheel.

To the plate 9 are fastened an inner brake drum 10 and an outer brake drum 12. The means shown for such fastening comprises flanges 13 and 14 on the drums 10 and 12 respectively, which are bolted to the plate 9. Other suitable fastening means may of course be used. It is clear without further illustration that the drums might be formed integral with the plate 9.

Inner and outer brake bands are shown respectively at 23 and 24. The bands have brake linings 25 and 26 of suitable material.

A housing 15 for the brake is supported on the fixed axle 17 of the wheel by a collar 18 through the intermediary of flexible arms 19. Other suitable means may be used instead of the flexible arms. The flexibility is afforded by links 20 in the arms. A set screw 45 holds the collar in position on the axle 17.

The axle 17a of the wheel is as usual mounted at the end of the fixed axle 17, by means of a knuckle joint 17c, for the purpose of turning the wheel about a vertical axis, in steering the vehicle of which the wheel is a part.

The housing has a circumferential foot 21 adjacent to the plate 9. A ring 22 fastened on the plate 9 permits rotation of the wheel relative to the housing, but laps over the foot 21 to compel the housing to move in conjunction with the wheel when the latter turns about its vertical axis. Suitable antifriction bearings may of course be used between the ring 22 and the foot 21. It is thought unnecessary to illustrate this in the drawings.

The actuating mechanism for the brake bands consists of a reciprocating bar 27 that has an arm 28 extending through an opening 29 in the housing. It is to be understood that the arm 28 may extend through any other suitably disposed opening in the housing. A wrist 30 is formed on the portion of the arm within the housing.

Adjacent ends of the brake bands are pivotally connected with bell cranks 31 by means hereinafter more fully explained. The opposite ends of the bell cranks have forks 32 around the wrist 30. A standard 33 on the collar 18 provides a fulcrum for an operating lever 34 that effects the reciprocation of the bars 27. The lever 34 and the bar 27 have a flexible connection afforded by links 35.

The lever 34 in turn pivotally supports a crank 36 fulcrumed at an end to one of the arms 19. The end of the crank 36, opposite to the pivoted end, is connected with a brake rod 37.

The inner brake band 23 has apertured ears 50 fastened thereto near the ends thereof. The ears project into the space between the brake bands. Short floating bands 51 adjacent to the ends of the brake bands have at one end apertured ears 38 opposed to the ears 50 and at the other end lugs linked with one end of the ball cranks. When operating the brake, the inner band is contracted by force transmitted through the bell cranks and through the floating bands to the lugs 50 on the band.

The apertures in the lugs 38 and 50 are threaded for the reception of adjusting bolts 39. The bolts carry beveled pinions 40. To operate the adjusting bolts, a beveled pinion 41 is provided to engage the pinion 40. The pinion 41 is carried by a stub shaft 42 that is supported on a bracket 43. The shaft 42 projects through the housing and carries a screw head 44 on the projecting end, whereby to rotate the bevel gears by means of a screw driver.

The adjusting means is shown only on the inner band 23. This is deemed sufficient, since it adjusts the outer band 24. For instance, as the adjusting bolts push the floating bands away from the lugs 50, the bell cranks 31 push the ends of the outer band 24 apart, which adjusts the outer band by the adjusting means on the inner band.

Conversely, when the adjusting bolts draw the floating bands toward the lugs 50, the bell cranks draw the ends of the outer band together.

The brake bands are held against rotation by means of a T-shaped bracket 46 fastened to the housing 15. The T-shaped bracket projects from a plate 46, into the space between the brake bands. Bosses 48 on opposed faces of the brake bands have openings for the ends of the arms of the bracket 47.

The brake bands may move longitudinally of the arms of the T-shaped bracket to permit expansion and contraction of the bands, but rotation of same is thereby prevented.

In the operation of my brake means, the brake rod 37 is operated by suitable lever means located conveniently for the driver of the vehicle.

Operation of the brake rod actuates the crank 36, which in turn reciprocates the bar 27. Upward movement of the bar 27, as it is shown in Figure 2, forces the brake bands apart, thereby contracting the inner band 23 and expanding the outer band 24 toward their respective drums.

Downward movement of the bar 27 will reverse the movement of the brake bands and release both siumltaneously from the drums.

Turning movement of the wheel about the vertical axis does not disturb the operation just described, due to the flexible connection between the lever 34 and the bar 27.

The housing is supported and held against rotation by the flexible arms 19. The housing is made to follow the turning movements of the wheel by the circular foot 21 and circular ring 22

Rotation of the brake bands is prevented by the T-shaped bracket. Adjustment of the brake bands is effected by the adjusting bolts 39 in the manner described.

The dotted lines in Figure 1 give an illustration of a position of the flexible arms when the axle of the wheel is out of alinement with the fixed axle 17.

The pivotal mounting for the wheel on the axle has not been shown in detail since it is not per se a part of this invention and since any suitable means may be employed.

Changes may be made in the construction and arrangement of parts without departing from the spirit of the invention.

What I claim and desire to secure by Letters Patent is:

Brake mechanism comprising a rotary body having brake faces, brake bands cooperative with said faces, mechanism for the simultaneous expansion and contraction of the brake bands, including bell cranks fulcrumed at the ends of one of the bands, lugs at the end portions of the other band, members slidable upon the last mentioned band, in pivotal connection with the bell cranks, and adjusting screws for the members, mounted on the lugs, a housing for the brake faces and the brake bands, and means for rotation of the adjusting screws, exteriorly of the housing.

In testimony whereof I have affixed my signature.

ABRAM E. MINIUM.